(12) United States Patent
Flaum et al.

(10) Patent No.: US 11,872,973 B2
(45) Date of Patent: *Jan. 16, 2024

(54) METHOD FOR ADJUSTING BRAKE PRESSURES, BRAKE SYSTEM OF A MOTOR VEHICLE FOR CARRYING OUT SUCH METHOD, AND MOTOR VEHICLE COMPRISING SUCH A BRAKE SYSTEM

(71) Applicant: ZF CV SYSTEMS EUROPE BV, Brussels (BE)

(72) Inventors: Nikolai Flaum, Hannover (DE); Van Tien Nguyen, Hannover (DE); Torsten Wallbaum, Duingen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 189 days.

This patent is subject to a terminal disclaimer.

(21) Appl. No.: 16/323,525

(22) PCT Filed: Jun. 20, 2017

(86) PCT No.: PCT/EP2017/000711
§ 371 (c)(1),
(2) Date: Feb. 6, 2019

(87) PCT Pub. No.: WO2018/033229
PCT Pub. Date: Feb. 22, 2018

(65) Prior Publication Data
US 2019/0193696 A1    Jun. 27, 2019

(30) Foreign Application Priority Data
Aug. 17, 2016  (DE) .................. 10 2016 009 997

(51) Int. Cl.
*B60T 8/1766* (2006.01)
*B60T 8/1755* (2006.01)
(Continued)

(52) U.S. Cl.
CPC .......... *B60T 8/1766* (2013.01); *B60T 8/1755* (2013.01); *B60T 8/268* (2013.01); *B60T 13/68* (2013.01)

(58) Field of Classification Search
CPC ...... B60T 7/042; B60T 13/662; B60T 13/686; B60T 17/22; B60T 2220/04; B60T 13/66;
(Continued)

(56) References Cited

U.S. PATENT DOCUMENTS 4,774,667 A * 9/1988 Kuraoka ............. B60T 8/17616
303/174
5,011,236 A * 4/1991 Toepfer .................... B60T 8/00
303/128

(Continued)

FOREIGN PATENT DOCUMENTS

CN         103180185 A      6/2013
CN         203198953 U  *   9/2013
(Continued)

*Primary Examiner* — Robert A. Siconolfi
*Assistant Examiner* — Mahbubur Rashid
(74) *Attorney, Agent, or Firm* — LEYDIG, VOIT & MAYER, LTD.

(57) ABSTRACT

A method for adjusting brake pressures on wheel brakes of a motor vehicle includes adjusting, in a normal braking mode as a function of a driver's braking demand determined by a driver of the motor vehicle, the brake pressures on the wheel brakes. The method further includes carrying out, by a brake control unit in a pressure control mode, adjustment of the brake pressures on the wheel brakes to implement at least a drive stability function and/or external braking demands. Furthermore, the method includes determining, by the brake control unit, the brake pressures on the wheel brakes at least when implementing external braking demands while controlling an ideal pressure distribution ratio of the brake pressures at wheel brakes of the front axle to the brake pressures at wheel brakes of a rear axle of the (Continued)

motor vehicle, wherein the control function takes into account a pressure distribution ratio.

14 Claims, 2 Drawing Sheets

(51) Int. Cl.
  *B60T 8/26* (2006.01)
  *B60T 13/68* (2006.01)
(58) Field of Classification Search
  CPC ........ B60T 13/74; B60T 17/221; B60T 8/172;
    B60T 8/1755; B60T 8/1766; B60T 8/267;
    B60T 13/741; B60T 2270/602; B60T
    2270/608; B60T 8/268; B60T 8/32; B60T
    17/18; B60T 2270/406; B60T 2270/82;
    B60T 8/329; B60T 8/4266; B60T 8/58;
    B60T 8/88; B60T 8/90; B60L 2240/12
  See application file for complete search history.

(56) References Cited

U.S. PATENT DOCUMENTS

| | | | |
|---|---|---|---|
| 5,163,742 A | 11/1992 | Toepfer et al. | |
| 5,178,231 A * | 1/1993 | Watanabe | B60K 23/0808 |
| | | | 180/197 |
| 5,240,312 A * | 8/1993 | Burckhardt | B60T 8/1764 |
| | | | 303/198 |
| 5,865,513 A * | 2/1999 | Inagaki | B60T 8/1755 |
| | | | 303/189 |
| 6,009,366 A * | 12/1999 | Burkhard | B60T 8/1764 |
| | | | 180/197 |
| 6,280,003 B1 * | 8/2001 | Oshiro | B60T 8/1764 |
| | | | 303/9.62 |
| 8,974,010 B2 * | 3/2015 | Yang | B60T 13/745 |
| | | | 303/6.01 |
| 9,555,789 B2 * | 1/2017 | Jeon | B60T 13/662 |
| 2005/0001477 A1 * | 1/2005 | Mederer | B60T 8/323 |
| | | | 303/113.5 |
| 2012/0203438 A1 | 8/2012 | Breuer et al. | |
| 2012/0323460 A1 * | 12/2012 | Okubo | B60W 40/105 |
| | | | 701/74 |
| 2013/0062930 A1 | 3/2013 | Muntu et al. | |
| 2013/0204503 A1 | 8/2013 | Watanabe | |
| 2014/0117749 A1 * | 5/2014 | Yang | B60T 8/4081 |
| | | | 303/20 |
| 2014/0188363 A1 | 7/2014 | Eckert et al. | |
| 2015/0046057 A1 * | 2/2015 | Lauser | B60T 8/171 |
| | | | 701/79 |
| 2016/0159331 A1 * | 6/2016 | Yang | B60T 8/4086 |
| | | | 303/15 |
| 2016/0214591 A1 * | 7/2016 | Yang | B60T 13/662 |
| 2017/0136917 A1 * | 5/2017 | Heisel | B60L 15/20 |
| 2017/0158184 A1 * | 6/2017 | Choi | B60T 13/686 |
| 2017/0182989 A1 * | 6/2017 | Takeda | B60T 8/72 |
| 2017/0210369 A1 * | 7/2017 | Lim | B60T 7/042 |
| 2017/0247023 A1 * | 8/2017 | Owen | B60T 8/241 |
| 2017/0334417 A1 * | 11/2017 | Choi | B60T 8/442 |
| 2018/0111593 A1 * | 4/2018 | Kim | B60T 13/142 |
| 2018/0111594 A1 * | 4/2018 | Kim | B60T 8/17 |
| 2018/0290642 A1 * | 10/2018 | Tschiene | B60T 8/171 |
| 2018/0304871 A1 * | 10/2018 | Eckert | B60T 8/268 |

FOREIGN PATENT DOCUMENTS

| | | | |
|---|---|---|---|
| CN | 103648865 A | 3/2014 | |
| DE | 19622838 C2 * | 4/2001 | ............ B60T 8/1764 |
| DE | 102008032544 A1 | 2/2009 | |
| DE | 102009058154 A1 | 6/2011 | |
| EP | 0445575 A2 | 9/1991 | |
| JP | H0911871 A * | 1/1997 | |
| JP | 2008044546 A * | 2/2008 | |
| JP | 2008044546 A * | 2/2008 | |
| JP | 2008189047 A * | 8/2008 | |
| KR | 19990000672 A * | 1/1999 | |
| WO | 2011073415 A1 | 6/2011 | |

* cited by examiner

METHOD FOR ADJUSTING BRAKE PRESSURES, BRAKE SYSTEM OF A MOTOR VEHICLE FOR CARRYING OUT SUCH METHOD, AND MOTOR VEHICLE COMPRISING SUCH A BRAKE SYSTEM

CROSS REFERENCE TO RELATED APPLICATIONS

This application is a U.S. National Stage Application under 35 U.S.C. § 371 of International Application No. PCT/EP2017/000711 filed on Jun. 20, 2017, and claims benefit to German Patent Application No. DE 10 2016 009 997.6 filed on Aug. 17, 2016. The International Application was published in German on Feb. 22, 2018, as WO 2018/033229 A1 under PCT Article 21(2).

FIELD

The invention concerns a method for adjusting brake pressures on wheel brakes of a motor vehicle, to a brake system for carrying out such a method, and to a motor vehicle having such a brake system.

BACKGROUND

The wheels of a motor vehicle are braked to decelerate the motor vehicle. For this purpose, wheel brakes of the wheels each comprise brake cylinders that are actuated by means of a working medium, i.e. hydraulically or pneumatically. In the case of utility vehicles, the desired brake pressure in the brake cylinders is produced pneumatically as a rule.

With modern brake systems with brake control units, the brake pressure is adjusted directly by the driver of the motor vehicle in a normal braking mode. As a rule, the driver transmits his braking demand by operating a brake pedal. Typically, a service brake valve is actuated by means of the brake pedal and as a result the brake cylinders are supplied from a pressure reservoir.

Alternatively to the normal braking mode, the brake control unit carries out the adjustment of the brake pressures in a pressure control mode, wherein the brake pressure is adjusted according to the specification of the brake control unit when determining corresponding braking requirements or control requirements. Such braking requirements can for example be the implementation of drive stability functions that access a pressure medium reservoir, such as for example those of an anti-lock braking system (ABS), if the control unit detects the presence of a tendency to locking of certain wheels.

An anti-lock braking system continuously monitors the revolution rates of each wheel by means of measurement signals of revolution rate sensors and determines therefrom the respective wheel slip. This can for example be carried out by comparing the wheel speed determined from the wheel revolution rate with a vehicle reference speed. If a tendency to locking of the wheel is detected from the wheel slip determined in this way, meaning that a specified slip limit is reached or exceeded, the brake control unit takes over control of the adjustment of the brake pressure.

DE 10 2009 058 154 A1 discloses such a brake system, the brake control unit of which carries out the adjustment of the brake pressure in the pressure control mode. In this case, the brake control unit also carries out the adjustment of the brake pressure in the pressure control mode to implement further external braking demands. External braking demands are independent of the driver's braking demand and are specified by external driver assistance systems of the brake control unit, for example. As systems implemented separately from the brake control unit, driver assistance systems output braking demand signals, i.e. XBR requests ("eXternal Brake Requests"), to the brake control unit of the brake system according to the desired braking performance, for example by means of a data bus.

The brake control unit must aim for driving behavior that is as stable as possible during adjustment of the brake pressures at the individual wheel brakes of the motor vehicle. In doing so, the brake pressure at the front wheels must have a pressure distribution ratio to the brake pressure at the rear wheels such that the front axle locks before the rear axle at all times, i.e. in particular for different loads and load states of the motor vehicle.

SUMMARY

In an embodiment, the present invention provides a method for adjusting brake pressures on wheel brakes of a motor vehicle. The method includes adjusting, in a normal braking mode as a function of a driver's braking demand determined by a driver of the motor vehicle, the brake pressures on the wheel brakes. The method further includes carrying out, by a brake control unit in a pressure control mode, adjustment of the brake pressures on the wheel brakes to implement at least a drive stability function and/or external braking demands. Furthermore, the method includes determining, by the brake control unit, the brake pressures on the wheel brakes at least when implementing external braking demands while controlling an ideal pressure distribution ratio of the brake pressures at wheel brakes of the front axle to the brake pressures at wheel brakes of a rear axle of the motor vehicle, wherein the control function takes into account a pressure distribution ratio starting value that is determined in the normal braking mode and that is stored and maintained to be subsequently taken into account in the pressure control mode.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

It has been proposed to adjust the brake pressures in the pressure control mode while controlling an ideal pressure distribution ratio. In doing so, the pressure distribution between the axles is implemented while taking into account a differential slip between said axles such that there is a differential slip that is as small as possible. In this case, the differential slip shall be kept as small as possible, so that for an ideal pressure distribution or for an ideal pressure distribution ratio all wheels of the vehicle lock up at the same time or almost at the same time. In this way, the desired deceleration is achieved faster as a rule. In addition, the reduction of the differential slip or the adjustment of an ideal pressure ratio prevents an unwanted intervention by the anti-lock function. An unwanted intervention by the anti-lock function is excluded or is carried out as late as is actually possible owing to the specified physical conditions. A specification of the pressure distribution ratio is adjusted as a function of the differential slip in this case, which requires a certain time in the context of control. Unfortunately, an ideal pressure distribution is unknown in the prevailing driving situations of a motor vehicle and varies over a large range as a function of the load on the motor vehicle. The probability of one or more of the wheels tending to lock is therefore high in practical driving operations.

Embodiments of the invention enable very rapid adjustment of an ideal pressure distribution ratio by a brake control unit in a pressure control mode.

According to embodiments of the invention, in the normal braking mode a starting value for the pressure distribution ratio (pressure distribution ratio starting value) is determined for a controller and is stored and maintained to subsequently be taken into account in the pressure control mode. The influence of the load state of the utility vehicle on the ideal pressure distribution ratio is already taken into account by determining the pressure distribution ratio starting value in the normal braking mode, so that the control is based on a pressure distribution ratio that is already close to the ideal value to be controlled. That is, the pressure distribution ratio starting value provides an accurate estimate of the ideal brake pressure distribution ratio, which can be specified as the pressure distribution ratio starting value for the control function. As a rule, only quantitatively small and mainly few control interventions are necessary to adjust the ideal pressure distribution ratio starting from the pressure distribution ratio starting value that is determined according to the invention. The control of the ideal pressure distribution ratio is preferably carried out by controlling the differential slip between the axles. With the invention, pressure distribution ratio starting values are also determined for motor vehicles with more than two axles, wherein preferably pairs of axles each of two axles are considered or the pressure distribution ratio thereof is controlled with a pressure distribution ratio starting value determined according to the invention in the normal braking mode.

The determination of the pressure distribution ratio starting value in the normal braking mode is possible with little Information. In a preferred embodiment of the invention, the revolution rate measurement values for the wheels that are available to the brake control unit are used for determining the pressure distribution ratio starting value. The pressure distribution ratio starting value is determined in this case by detecting a first revolution rate measurement value for the front axle and a second revolution rate measurement value for the rear axle and determining a reference value of a motion variable of the motor vehicle at the same measurement time. In this case, the reference value can be detected by a separate motion sensor of the motor vehicle or can be derived by analyzing the revolution rate measurement values of the axles. The revolution rate measurement values are detected by revolution rate sensors of the respective wheels, which have a signal transmission connection to the brake control unit. The first revolution rate measurement value of the front axle and the second revolution rate measurement value of the rear axle are each combined with the reference value in a manner representing the wheel slip at the respective axle. In this way, slip values are determined for each axle, which is understood to include both the wheel slip and also other physical motion variables that determine the wheel slip, for example the speed or the acceleration.

The first slip value formed in this way with respect to the front axle and the second slip value with respect to the rear axle are set in a ratio to each other and the distribution index determined in this way is combined with a specified pressure distribution ratio. The specified pressure distribution ratio that is combined, for example multiplied, with the distribution index for the pressure distribution ratio starting value according to the invention, is fixedly specified to the brake control unit or is dynamically determined in the case of an electronic brake system (EBS).

In accordance with the assumption of the ideal pressure distribution ratio, i.e. that there should be no differential slip between the axles being considered, the first slip values and the second slip values are taken into account reciprocally in the distribution index with reference to the axles in the pressure distribution ratio. The following equation for determining the pressure distribution ratio starting value results from this by taking into account the respective wheel slip as slip values to be processed of the respective axles:

$$(P_{FA}/P_{RA})=(\lambda_{RA}/\lambda_{FA})*(P_{FA}/P_{RA})_{nonideal}$$

In the equation, the brake pressures are indicated by the symbol "P". First slip values for the front axle and second slip values for the rear axle are determined as respective wheel slip and represented in the equation by the symbol "$\lambda$". The index "FA" stands for a variable associated with the front axle in the equation. Accordingly, variables related to the rear axle are denoted by the Index "RA". The specified pressure distribution ratio, which is treated as non-ideal and according to the invention is linked to the distribution index, is denoted by the Index "nonideal".

Advantageously, for determining the slip values for the respective axles from the first revolution rate value of the front axle and the second revolution rate value of the rear axle, a translational motion variable of the motor vehicle is determined and combined with the reference value in the same physical variable. If in an advantageous embodiment the speed is taken into account as a motion variable, then speeds are derived from the revolution rate measurement values of the axles and the reference value is also determined as the reference speed of the motor vehicle. The following equation for the determination of the pressure distribution ratio starting value results therefrom:

$$(P_{FA}/P_{RA})=((v_{RA}-v_{Veh})/(v_{FA}-v_{Veh}))*(P_{FA}/P_{RA})_{nonideal}$$

In the above equation, the speed is denoted by the symbol "v". In this case, the index "Veh" denotes a reference variable related to the motor vehicle, i.e. the reference speed of the motor vehicle in this case.

In a further advantageous embodiment of the invention, the acceleration is taken into account as a motion variable for the determination of the pressure distribution ratio starting value. The following equation, in which the acceleration is denoted by symbol "a", results therefrom:

$$(P_{FA}/P_{RA})=((a_{RA}-a_{Veh})/(a_{FA}-a_{Veh}))*(P_{FA}/P_{RA})_{nonideal}$$

If the brake control unit has no signal related to the speed of the vehicle available, the measurement value of a longitudinal acceleration sensor is used for the determination of the pressure distribution ratio starting value. If information about the longitudinal acceleration is also unavailable, the speed of the vehicle is derived as a reference value from the individual revolution rate measurement values of the wheels, for example the highest speed value of the detected wheels during a braking process is referred to as a reference value for the determination of slip values.

In one advantageous embodiment of a brake system, the pressure control valves are disposed in one or more brake circuits, which can be connected via respective activation valves to a pressure medium reservoir, wherein each activation valve is electrically connected to the brake control unit and can be switched by the brake control unit. To change the braking mode, i.e. a change from the normal braking mode to the pressure control mode and vice-versa, the brake control unit changes the valve setting of the activation valve. In the pressure control mode, the brake control unit enables a fluidic pneumatic connection between the pressure control valve and the pressure medium reservoir by means of the activation valve of the relevant brake circuit, so that the brake pressure of the wheel brakes can be adjusted by means of the respective pressure control valve. Advantageously, the pressure control valves of the wheels of an axle of the motor vehicle are connected to a pressure medium reservoir via a common brake circuit with an activation valve of said brake circuit.

The activation valves are advantageously embodied as 3/2-way valves, for example solenoid valves, wherein the pressure control valve is connected to the working connection of the activation valve and in a first valve setting is connected to the service brake valve. Said first valve setting is provided for the normal braking mode. For activating the pressure control mode, i.e. for implementing a drive stability function and/or an external braking demand, the activation valve is switched into the second valve setting and the braking medium reservoir is switched through directly to the pressure control valve.

Figure 1:
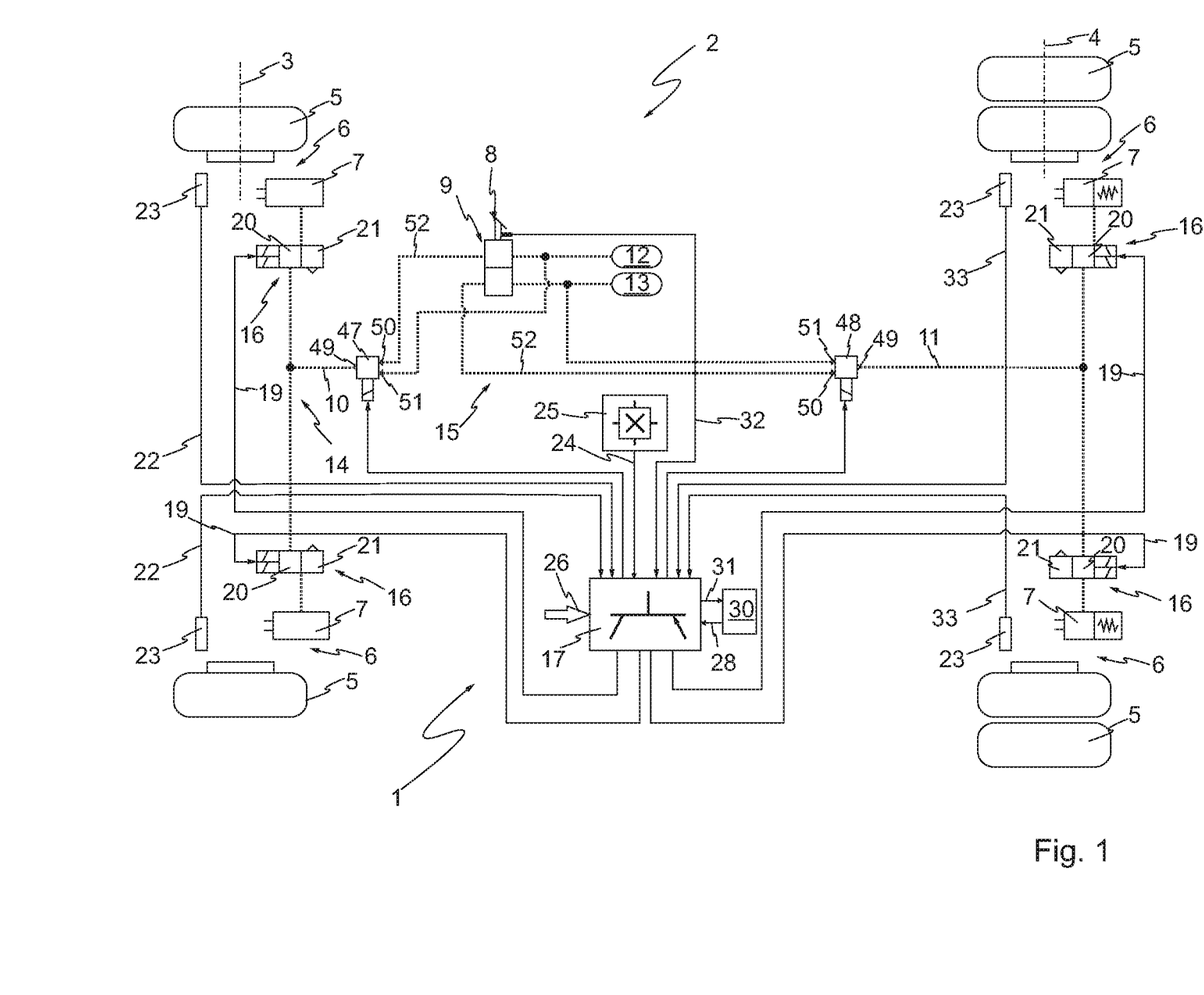
FIG. 1 shows a pneumatic and electrical schema of a brake system of a utility vehicle.

FIG. 1 shows an electrical-pneumatic schema of a pneumatic brake system 1 of a motor vehicle 2, namely a utility vehicle. Electrical lines are represented with solid lines and pneumatic lines with dotted lines. The motor vehicle 2 comprises two axles in the exemplary embodiment shown, namely a front axle 3 lying forwards in the direction of travel and a rear axle 4, on each of which wheels 5 are disposed on both sides. For decelerating the motor vehicle 2, a wheel brake 6 is associated with each wheel 5. The wheel brakes 6 are pneumatically operated and each comprises a brake cylinder 7. The wheel brakes 6 exert a braking force on the rotating wheel 5 according to the respective pneumatic brake pressure acting in the brake cylinder 7.

A brake pedal 8 that is disposed in the driver's cab of the motor vehicle 2 is coupled to a service brake valve 9. The driver of the motor vehicle 2 switches pneumatic pressure through to the brake cylinders 7 by operating the brake pedal 8 and thereby actuates the wheel brakes 6. For this purpose, the service brake valve 9 controls pneumatic brake lines 10, 11 between the pressure medium reservoirs 12, 13 and the brake cylinders 7.

In the exemplary embodiment shown, the brake system 1 comprises two brake circuits, wherein a first brake circuit 14 is associated with the front axle 3 and a second brake circuit 15 is associated with the rear axle 4. The brake cylinders 7 of the wheels 5 of the front axle 3 are therefore connected via the brake line 10 to the pressure medium reservoir 12 of the first brake circuit 14. The brake cylinders 7 of the wheel brakes 6 of the rear axle 4 are connected via the brake line 11 to the pressure medium reservoir 13 of the second brake circuit 15. The brake pressure in the brake cylinders 7 can therefore be adjusted in a normal braking mode (reference character 29 in FIG. 2) as a function of the position of the brake pedal 8, i.e. as a function of a driver's braking demand 32.

A pressure control valve 16 that is electrically actuated by a brake control unit 17 in a pressure control mode (reference character 18 in FIG. 2) is associated with each wheel brake 6 of the brake system 1. The pressure control valves 16 have a signal transmission connection to the brake control unit 17 for receiving control signals 19. The pressure control valves 16 are each a combination of two solenoid valves, namely an inlet valve 20 and an outlet valve 21. In this case, in principle the inlet valve 20 is used to increase pressure or to maintain the pressure in the brake cylinders 7, whereas the outlet valve 21 is opened to reduce the brake pressure and vents the respective connected brake cylinder 7.

In the pressure control mode 18, the brake control unit 17 carries out the adjustment of the brake pressure of the respective wheel brakes 6 by correspondingly actuating the pressure control valves 16. An electrically actuated activation valve 47, 48 that can be actuated by the brake control unit 17, is associated with each brake circuit 14, 15. Each activation valve 47, 48 is embodied as a 3/2-way solenoid valve, i.e. it comprises three connectors 49, 50, 51 and two switch positions. In this case, the supply connector 49 of the respective activation valve 47, 48 is associated respectively with the brake line 10, 11, which is alternatively connected to one of the two supply connections 50, 51 according to the switch position of the activation valve 47, 48.

The first activation valve 47 of the first brake circuit 14 thus controls the supply of the brake line 10 and the second activation valve 48 of the second brake circuit 15 controls the supply of the brake line 11. A pressure line 52 to the service brake valve 9 is connected to a first supply connector 50 of each of the activation valves 47, 48. The second supply connector 51 is connected to the pressure medium reservoir 12, 13 of the respective brake circuit 14, 15. In the normal braking mode, the activation valve 47, 48 connects the brake line 10, 11 to the service brake valve 9, so that the brake pressure can be adjusted by means of the service brake valve 9. In the pressure control mode 18, the brake control unit 17 can connect the brake line 10, 11 directly to the respective pressure medium reservoir 12, 13 by changing the switch position of the activation valve 47, 48.

The brake control unit 17 is embodied and configured to implement drive stability functions and/or external braking demands to carry out the adjustment of the brake pressures in the pressure control mode 18. The brake control unit 17 continuously receives revolution rate measurement values 22, 33 from revolution rate sensors 23 of the wheels 5 of the motor vehicle 2. For this, one revolution rate sensor 23 each is associated with each wheel 5 of the motor vehicle 2, so that the brake control unit 17 always has a revolution rate measurement value 22, 33 for each wheel 5 available. The brake control unit 17 is, in addition to the revolution rate sensors 23 and the pressure control valves 16, an essential component of an anti-lock braking system of the brake system 1 and implements the drive stability function 45 thereof, namely an anti-lock function. The brake control unit 17 monitors the tendency to locking of the respective wheels 5 by means of the revolution rate measurement values 22, 33.

By analyzing the revolution rate measurement values 22, 33, the brake control unit 17 infers the tendency to locking of the respective wheel 5. I.e., if the controlled braking force exceeds the maximum transferable braking force at one or more wheels, said wheel starts to lock up, whereby the motor vehicle 2 can become unstable. By means of the revolution rate sensors 23, the anti-lock function of the brake control unit 17 monitors the revolution rate of each wheel 5. In doing so, a motion variable (reference character 38 in FIG.

Figure 2:
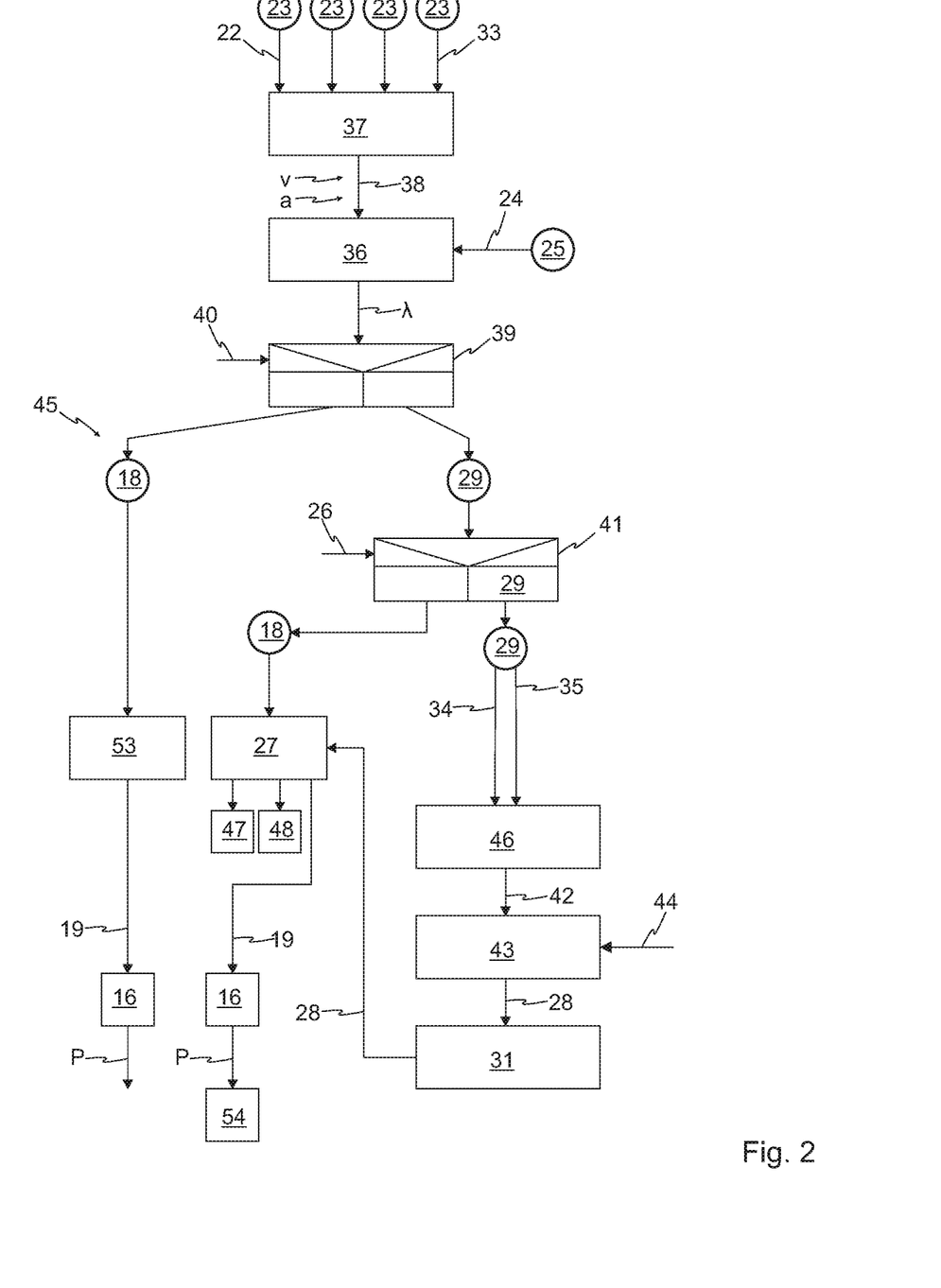
FIG. 2 shows a flow chart of an exemplary embodiment of a method for adjusting the brake pressures in a brake system according to FIG. 1.

2) determined from the revolution rate measurement values 22, 33, for example the wheel speed, is compared with a calculated or measured reference value 24 for the corresponding motion variable of the motor vehicle 2 at the same respective measurement time. If a tendency to locking of the wheel 5 is detected by means of the wheel slip determined in this way, i.e. if a specified slip limit is reached or exceeded, the brake control unit 17 carries out the control over the adjustment of the brake pressure in the pressure control mode 18. In this case, a reduction of the brake pressure is carried out in a first step in order to then control the brake pressure of the relevant wheel 5 along the slip limit. Should a suitable motion variable of the motor vehicle 2 be known by other modules of the brake system 1, then the corresponding information is specified to the brake control unit 17 as a reference value 24 for determining slip. In the exemplary embodiment shown, a longitudinal acceleration sensor 25 is disposed on the motor vehicle 2, from the measurement signals of which the brake control unit 17 derives the desired reference values 24.

The brake control unit 17 is embodied to receive external braking demands 26 from driver assistance systems of the motor vehicle 2. If there are external braking demands 26 present, then the brake control unit 17 carries out the adjustment of the brake pressures. For this purpose, the brake control unit 17 brings the activation valves 47, 48 into the switch position provided for the pressure control mode 18 (i.e. direct switch through to the pressure medium reservoir) and feeds control signals 19 to the pressure control valves 16 of the respective wheel brakes 6 to implement the external braking demand 26.

In the pressure control mode 18 (FIG. 2), at least when implementing external braking demands 26, the brake control unit 17 adjusts the brake pressures while controlling an ideal pressure distribution ratio of the brake pressures at the wheel brakes 6 of the front axle 3 to the brake pressures at the wheel brakes 6 of the rear axle 4 of the motor vehicle 2. In this case, the ratio of the brake pressures of the front axle 3 to the brake pressures of the rear axle 4 at which the same wheel slip is determined at the wheels 5 is adopted as an ideal pressure distribution ratio. This is carried out advantageously by monitoring a differential slip as the difference of the wheel slip of the two axles that are being considered.

By controlling the pressure distribution ratio, an unwanted intervention by the anti-lock function is prevented, which is excluded as long as, or is carried out as late as, is actually possible under the given physical conditions. All wheels 5 of the motor vehicle 2 lock up at the same time or almost at the same time.

The control function 27 (FIG. 2), the control variable of which is the brake pressure by means of varying the control signals 19 for the pressure control valves 16, takes into account a pressure distribution ratio starting value 28 of the pressure distribution ratio, which is determined in the normal braking mode 29 (FIG. 2) and which is maintained to be taken into account subsequently in the pressure control mode 18. The determination of said pressure distribution ratio starting value 28 for the control function 27 is described in detail below using FIG. 2. A memory element 30 is associated with the brake control unit 17 for storing 31 the pressure distribution ratio determined in the normal braking mode 29, which is read out as the pressure distribution ratio starting value 28 for the control function 27 at the start of the pressure control mode 18.

FIG. 2 shows in a flow chart an exemplary embodiment for the determination of a pressure distribution ratio starting value 28 for a control function 27 of the pressure distribution ratio 54 of the brake pressures P between the front axle (reference character 3 in FIG. 1) and the rear axle (reference character 4 in FIG. 1). In the pressure control mode 18, the brake control unit produces control signals 19 for the pressure control valves (reference character 16 in FIG. 1) while controlling 27 an ideal pressure distribution ratio 54 of the brake pressures P at the wheel brakes of the front axle to the brake pressures P at the wheel brakes of the rear axle. In this case, the brake pressure P is influenced by the control function 27 by suitable actuation of the pressure control valves with control signals 19. Alternatively to the pressure control mode 28, the brake pressures P at the wheel brakes in the normal braking mode 29 are adjusted as a function of a driver's braking demand (reference character 32 in FIG. 1) that is determined by the driver of the motor vehicle. In the normal braking mode 29, the driver of the motor vehicle thus has full control over the adjustment of the brake pressure, wherein the brake control unit does not actively intervene in the adjustment of the brake pressure, but passively monitors the prerequisites for intervention to implement drive stability functions 45.

A drive stability function 45 of this type is that of the anti-lock braking system (FIG. 1), wherein the tendency to locking of the wheels is monitored. The revolution rate measurement values 22, 33 of the revolution rate sensors 23 on the wheels are combined with a reference value 24 of a motion variable of the motor vehicle at the same measurement time in a manner representing the wheel slip, and slip values are determined for each wheel, namely the wheel slip $\lambda$ in the exemplary embodiment according to FIG. 2. For the combination 36 with the reference value 24, motion variables 38 that correspond to the motion variable of the motor vehicle analyzed as a reference value 24 are determined in an analysis 37 of the revolution rate measurement values 22, 33.

In the exemplary embodiment according to FIG. 2, the speed v is taken into account as a motion variable 38, wherein the determination of the wheel slip $\lambda$ is carried out according to the following formula:

$$\lambda = (v - v_{Veh})/v_{Veh}$$

Instead of the speed v, alternatively the acceleration a can be taken into account as a motion variable 38.

In the exemplary embodiment according to FIG. 2, the brake control unit 17 adjusts the brake pressure to implement external braking demands 26 while controlling 27 the brake pressure ratio 54. In the pressure control mode 18, to implement the drive stability function 45 of the anti-lock braking system, control 53 of the brake pressure P is carried out by means of the pressure control valves 16 without taking into account the brake pressure ratio. In further exemplary embodiments that are not illustrated, taking into account the pressure distribution ratio is also provided in the event of anti-lock interventions.

The wheel slip $\lambda$ of the respective wheel is compared with a specified threshold value 40 in a comparison step 39. In doing so, exceeding the threshold value 40 signals a tendency to locking of the relevant wheel. If the wheel slip $\lambda$ of one or more wheels exceeds the specified threshold value 40, then a change of braking mode is carried out and the brake control unit 17 carries out the adjustment of the brake pressures in the pressure control mode 18. As a result, the drive stability function 45 of the anti-lock braking system is implemented. If none of the determined values of the wheel slip $\lambda$ exceeds the specified threshold value 40, then the brake control unit 17 remains in the normal braking mode 29 and in passive monitoring of the ride stability by comparing the wheel slip λ with the threshold value 40.

In a detection step 41, the brake control unit detects the presence of an external braking demand 26. If there is an external braking demand 26 present, then a change of braking mode is carried out and the brake system changes to the pressure control mode 18, in which the brake control unit 17 carries out the adjustment of the brake pressures P.

If the brake control unit 17 changes to the pressure control mode 18 to implement an external braking demand 26, then the brake control unit 17 actuates the activation valves 47, 48 (FIG. 1) and thereby initiates the active change of the brake pressures P and control 27 of the ideal pressure distribution ratio 54 in the pressure control mode 18. By the changeover of the activation valves 47, 48, the pressure control valves 16 are connected to the pressure medium reservoirs 12, 13, so that the brake pressure P at the wheel brakes 6 can be adjusted by means of the pressure control valves 16 by means of the inlet valve 20 or outlet valves 21 thereof.

In the normal braking mode 29, a pressure distribution ratio starting value 28 for the control function 27 is determined, which is maintained by storing to be subsequently taken into account in the pressure control mode 18. From this, a first slip value 34 for the front axle and a second slip value 35 for the rear axle are used from the values of the wheel slip λ that are determined during the monitoring of the tendency to locking, for example by the ride stability function 45 of the anti-lock braking system. The first slip value 34 for the front axle can be one of the two available values of the wheel slip λ or an average value of the two slip values for the wheels of the front axle. Accordingly, the second slip value 35 for the rear axle is one of the two wheel slips λ determined for the anti-lock function or an average value of the two values.

The first slip value 34 and the second slip value 35 for the pair of the front axle and rear axle under consideration are set 46 into a ratio relative to each other and thus a distribution index 42 is determined. The distribution index 42 is a factor that, in combination 43 with a specified pressure distribution ratio 44, yields the pressure distribution ratio starting value 28 for the control function 27 of the pressure distribution ratio in the pressure control mode 18. The specified pressure distribution ratio 44 be can a fixed specification value or is determined dynamically in the case of an EBS.

The distribution index 42 corresponds to the load state of the motor vehicle, so that by combination 43 with the specified value of the pressure distribution ratio 44, an actual pressure distribution ratio can be determined that is considerably closer to the ideal pressure distribution ratio 54 of the motor vehicle 2 in the current load situation.

For the determination of the distribution index 42, the first slip values 34 for the front axle and the second slip values 35 for the rear axle are taken into account reciprocally in relation to the respective pressure ratios. This corresponds to the assumption that in the ideal pressure distribution ratio the slip values 34, 35 of the axles of the motor vehicle 2 being considered are equal, or no differential slip exists.

The determination of the pressure distribution ratio starting value 28, which forms the basis for the start of the control function 27 after the change to the pressure control mode 18, is advantageously determined during the normal braking mode 29 during comparatively weak vehicle decelerations, i.e. negative accelerations of for example $-1$ m/s$^2$ to $-1.5$ m/s$^2$, in order to reduce dynamic influences.

The adjustment of the brake pressure P in a pressure control mode 18 with a control function 27 while taking into account a pressure distribution ratio starting value 28 determined in the normal braking mode 29 can also be used for motor vehicles with a plurality of axles. Moreover it can also be used for conventional brake systems with an anti-lock braking system (ABS) and for electronic brake systems (EBS).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1. brake system
2. motor vehicle
3. front axle
4. rear axle
5. wheel
6. wheel brake
7. brake cylinders
8. brake pedal
9. service brake valve
10. brake line
11. brake line
12. pressure medium reservoir
13. pressure medium reservoir
14. first brake circuit
15. second brake circuit
16. pressure control valve
17. brake control unit
18. pressure control mode
19. control signal
20. inlet valve
21. outlet valve
22. first revolution rate measurement values
23. revolution rate sensor
24. reference value
25. longitudinal acceleration sensor
26. external braking demand
27. control function
28. pressure distribution ratio starting value 29. normal braking mode
30. memory element
31. storage
32. driver's braking demand
33. second revolution rate measurement values
34. first slip value
35. second slip value
36. combination
37. analysis
38. motion variable
39. comparison step
40. threshold value
41. detection step
42. distribution index
43. combination
44. specified pressure distribution ratio
45. ride stability function
46. set into a ratio
47. activation valve
48. activation valve
49. working connection
50. first supply connector
51. second supply connector
52. pressure line
53. control function
54. ideal pressure distribution ratio
P brake pressure
λ wheel slip
v speed
a acceleration

The invention claimed is:

1. A method for adjusting brake pressures on wheel brakes in a pneumatic brake system of a motor vehicle, the method comprising:
providing, in a normal braking mode and as a function of a driver's braking demand determined by a driver of the motor vehicle, brake pressures to the wheel brakes in the pneumatic brake system of the motor vehicle;
determining, during the normal braking mode, a pressure distribution ratio starting value between a front axle and a rear axle;
storing the pressure distribution ratio starting value in a memory;
adjusting, by a brake control unit in a pressure control mode, the brake pressures on the wheel brakes to implement a drive stability function and/or external braking demands,
wherein the adjusting includes adjusting an ideal pressure distribution ratio of brake pressures at wheel brakes of the front axle to brake pressures at wheel brakes of the rear axle according to a control function, the control function receiving, as input, the pressure distribution ratio starting value.

2. The method as claimed in claim 1, wherein the determining, during the normal braking mode, the distribution ratio starting value comprises:
detecting a first revolution rate measurement value of the front axle and a second revolution rate measurement value of the rear axle;
determining a reference value of a motion variable of the motor vehicle;
determining, based on the first revolution rate measurement value and the reference value of the motion variable, a first slip value for the front axle and determining, based on the second revolution rate measurement value and the reference value of the motion variable, a second slip value for the rear axle,
determining, based on a ratio of the first slip value to the second slip value, a distribution index, and
determining, by combining the distribution index with a specified pressure distribution ratio, the distribution ratio starting value.

3. The method as claimed in claim 2, the determining the first slip value and the determining the second slip value are further based on a determined motion variable value corresponding to the motion variable of the motor vehicle and combined with the reference value of the motion variable.

4. The method as claimed in claim 2, wherein a vehicle speed is the motion variable.

5. The method as claimed in claim 2, wherein a vehicle acceleration is the motion variable.

6. The method as claimed in claim 1, wherein the determining, during the normal braking mode, the pressure distribution ratio starting value is carried out while performing braking in the normal braking mode with an acceleration in a range of $-1$ m/s$^2$ to $-1.5$ m/s$^2$.

7. The pneumatic brake system of the motor vehicle for carrying out the method as claimed in claim 1, the pneumatic brake system comprising:
one pneumatic brake cylinder and one pressure control valve per wheel;
one activation valve per brake circuit that has a signal transmission connection to the brake control unit configured to receive control signals during the pressure control mode, and
a service brake valve configured to be actuated by a driver of the motor vehicle,
wherein the brake control unit is configured to adjust the brake pressures in the pneumatic brake cylinder in the normal braking mode by operating the service brake valve according to the driver's braking demand,
wherein the brake control unit is configured to adjust each respective brake pressure in each respective pneumatic brake cylinder in the pressure control mode via a respective activation valve and a respective pressure control valve.

8. The pneumatic brake system as claimed in claim 7, wherein the pressure control valves are disposed in one or more respective brake circuits, each respective brake circuit being connected, via the respective activation valve, to a respective pressure medium reservoir, each respective activation valve per brake circuit being electrically connected to the brake control unit and being configured to be switched by the brake control unit, wherein each respective pressure control valve of a respective wheel of a respective axle are connected to the respective pressure medium reservoir via a common brake circuit with the respective activation valve.

9. A motor vehicle with the pneumatic brake system as claimed in claim 7.

10. The method according to claim 1, further comprising activating the pressure control mode by switching an activation valve from a first valve setting provided for the normal braking mode to a second valve setting provided for the pressure control mode.

11. The method according to claim 10, further comprising comparing a wheel slip of a respective wheel with a threshold value and determining that the wheel slip exceeds the threshold value,
wherein the switching the activation valve from the first valve setting to the second valve setting is performed in response to the determining that the wheel slip exceeds the threshold value.

12. The method according to claim 1, wherein the ideal pressure distribution ratio is an approximated ratio of a brake pressure distribution at wheel brakes of the front axle to wheel brakes of the rear axle, wherein the approximated ratio provides a same slip value for the front axle and the rear axle.

13. The method according to claim 12, wherein the approximated ratio is approximated for a current load state of the motor vehicle, and is cumulatively approximated based on each adjustment of the ideal pressure distribution ratio.

14. The method according to claim 1, wherein adjusting, by the brake control unit in the pressure control mode, the brake pressures on the wheel brakes to implement the drive stability function and/or external braking demands further comprises:

adjusting the brake pressures on the wheel brakes closer to the brake pressures of the ideal pressure distribution ratio.

\* \* \* \* \*